United States Patent [19]
Altmann et al.

[11] Patent Number: 5,255,963
[45] Date of Patent: Oct. 26, 1993

[54] HYDRAULIC VEHICLE BRAKE SYSTEM WITH ANTI-SKID APPARATUS

[75] Inventors: Rainer Altmann, Erligheim; Rainer Lauer, Muenchingen; Guenther Schmidt, Tamm-Hohenstange; Kasimir Stromski, Filderstadt; Anton V. Zanten, Ditzingen-Schoeckingen; Alfred Sigl, Sersheim; Harald Hellmann, Ludwigsburg; Karl Veil, Uhingen; Hans-Joerg Fees, Bietigheim-Bissingen; Wolf-Dieter Jonner, Beilstein Schmidhausen; Reinhard Gutzeit, Stuttgart, all of Fed. Rep. of Germany

[73] Assignee: Robert Bosch GmbH, Stuttgart, Fed. Rep. of Germany

[21] Appl. No.: 561,649

[22] Filed: Aug. 1, 1990

[30] Foreign Application Priority Data

Aug. 9, 1989 [DE] Fed. Rep. of Germany ....... 3926242
Feb. 13, 1990 [DE] Fed. Rep. of Germany ....... 4004316

[51] Int. Cl.⁵ ............................................... B60T 8/32
[52] U.S. Cl. ............................................... 303/116.1
[58] Field of Search ............... 303/113, 115, 119, 116, 303/116.1, 116.2, 113.1, 113.2, 119.1

[56] References Cited

U.S. PATENT DOCUMENTS

| 3,866,983 | 2/1975 | Kondo | 303/119 |
|---|---|---|---|
| 4,027,924 | 6/1977 | Kondo | 303/119 |
| 4,395,073 | 7/1983 | Arikawa et al. | 303/116 |
| 4,640,558 | 2/1987 | Nomura et al. | 303/119 |

FOREIGN PATENT DOCUMENTS

| 3107963 | 1/1982 | Fed. Rep. of Germany . | |
| 0106759 | 4/1989 | Japan | 303/115 |
| 2218480 | 11/1989 | United Kingdom | 303/119 |

Primary Examiner—Matthew C. Graham
Attorney, Agent, or Firm—Edwin E. Greigg; Ronald E. Greigg

[57] ABSTRACT

A known hydraulic vehicle brake system has an anti-skid valve assembly. By this assembly, the at least one wheel brake can be temporarily disconnected from the master brake cylinder and connected to one inlet of a return pump, which furnishes the quantities of pressure fluid flowing out of the wheel brakes both to a damper chamber and, via a damper throttle, to the master brake cylinder and/or the at least one wheel brake. The disadvantage is that all of the pressure fluid pumped by the return pump can sometimes reach the master brake cylinder, disagreeably moving the brake pedal in the direction of its outset position. This can annoy a driver and should be avoided. The improved vehicle brake system has a valve, which in anti-skid operation can be blocked, located between the damper throttle and the master brake cylinder and also has a bypass throttle bypassing the valve. As a result, during anti-skid operation, the brake pedal is not displaced to such an annoying extent.

19 Claims, 5 Drawing Sheets

HYDRAULIC VEHICLE BRAKE SYSTEM WITH ANTI-SKID APPARATUS

BACKGROUND OF THE INVENTION

The invention is directed to improvements in a hydraulic vehicle brake system having an anti-skid capability.

The prior art in this area includes a vehicle brake system in accordance with FIG. 1 of German Offenlegungsschrift 31 07 963, in which a valve is built into a brake line originating at the master brake cylinder embodied as a one-way valve. This one-way valve can be opened by means of pressure from the master brake cylinder in the direction of at least one wheel brake. A pressure-equalizing bypass in the form of a line that forms a throttle bypasses the one-way valve. This throttling bypass is intended for completely eliminating any residual brake pressures in the wheel brake cylinders once the brake pedal is released, but this is impossible with check valves that are provided for fast evacuation of the wheel brake cylinders. This is because these check valves, for safety reasons, are equipped with closing springs, but they prevent complete evacuation of the wheel brake cylinders. As it is intended to do, the one-way valve installed in the brake line keeps pressure surges, caused by the return pump during anti-skid operation, from affecting the master brake cylinder. This averts brake pedal motions and consequent impacts on the driver's foot. Because all the pressure fluid to be drawn from the wheel brakes during anti-skid operation has to be collected in a high-pressure reservoir, the reservoir is disadvantageously large and heavy and is also expensive.

A further prior art vehicle brake system is known from German Offenlegungsschrift 26 43 860 having return pumps the outlets of which communicate with damper chambers and, via throttles disposed downstream of the damper chambers, with both the master brake cylinder and anti-skid valve assemblies. Providing the damper chambers in combination with the throttles mean that oscillations originating in the return pumps are damped to such an extent that they are no longer disturbing. However, it is disadvantageous that unless the quantities of pressure fluid flowing through the throttles are absorbed by the wheel brakes, they may possibly cause a very disturbing reciprocation of the brake pedal. This might frighten a timid driver and disadvantageously cause him to partially release the brake pedal.

OBJECT AND SUMMARY OF THE INVENTION

It is the principal object of the vehicle brake system according to the invention to provide the advantage over the generic vehicle brake system of German Offenlegungsschrift 26 43 860 that for little additional technical expense, feedback on the master brake cylinder during anti-skid operation is avoided and correspondingly the brake pedal is displaced to a lesser extent. Complete feedback suppression, as attained in the vehicle brake system of German Offenlegungsschrift 31 07 963 at major technological expense, is intrinsically undesirable, however, because a driver should preferably recognize via the brake pedal when brake pressures he has established via the brake pedal are excessively high for at least one vehicle wheel.

Another object and advantage of the vehicle brake system according to the invention is that during anti-skid operation, quantities of pressure fluid flow to wheel brakes from the master brake cylinder in a throttled manner during anti-skid operation, in order to re-establish brake pressures in the wheel brakes.

A further object of the invention is offered by the advantage that it can be made up in a simple manner, for example by having recourse to existing magnetic valves and throttles.

Another object of the invention is that at the onset of normal braking, brake pressures in the wheel brakes rise quickly, while in anti-skid operation, for partial or complete re-establishment of the brake pressures, quantities of pressure fluid flow from the master brake cylinder in throttled fashion to the wheel brakes, to avoid disadvantageously fast increases in pressure.

Yet another object of the invention is that the valve additionally acts as a throttle controllable by the feed pressure of the return pump. For this reason, feedback increases to a lesser extent than the feed pressures of the return pump.

Still another object and advantage is that during braking on an icy surface, for example, where the driver has intentionally kept the brake pressure low, any possible brake pedal restoration that might occur, with a relatively short restoring path, is recognizable clearly enough because of the substantially suppressed throttling in that case.

Yet another object is to provide advantageous dimensions, by means of which at low brake pressures and therefore with small pedal forces, a driver is given adequately clear notice of the onset of anti-skid operation; on the other hand, at comparably high brake pressures, the feedback on the brake pedal does increase so sharply that a driver would disadvantageously lessen the actuation of the brake pedal and thereby lengthen the braking distances.

Still another object is provided by the integration of the throttle into the hydraulically closable valve, providing the advantage that a remaining cross section will remain open with certainty; as a result a gradual pressure equalization between the master brake cylinder and the wheel brakes, or between the outlet of the return pump and the master brake cylinder, can take place.

An additional object of the invention provides dimensions based on which a favorable adaptation to existing requirements for a vehicle brake system can be done with little trial and error and further dimensions from which early lessening of the pedal feedback results.

An additional object is to provide the advantage that the valve is returnable into its outset position with great certainty. This has a particularly advantageous effect if the valve opening spring should fail. This characteristic has the further advantage that if the pressure of the master brake cylinder is intentionally increased by the driver, the valve makes a larger flow cross section available.

Yet another object is the advantage that of avoiding an overload on the return pump, should the throttle accidentally become more or less plugged up, for example by abraded rubber.

Still another object resides in a pump protection valve, the opening pressure of which is independent of the pressure prevailing in the master brake cylinder.

Yet an additional object discloses a pump protection valve that is less expensive and additionally has the advantage that because of its structure, plugging is reliably avoided.

Still another object resides in the advantage that largely using currently produced types of anti-skid systems, an improvement in the sense of the invention to reduce the pedal feedback is economically attainable by retrofitting. In yet another object of the invention during the onset of braking an outflow of pressure fluid from the master brake cylinder into the damper is avoided.

In still another object and advantage, even with the incorporation of a valve as claimed in claims 1-5, or the combination of a valve and a throttle, brake forces disappear rapidly upon release of the brake pedal.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
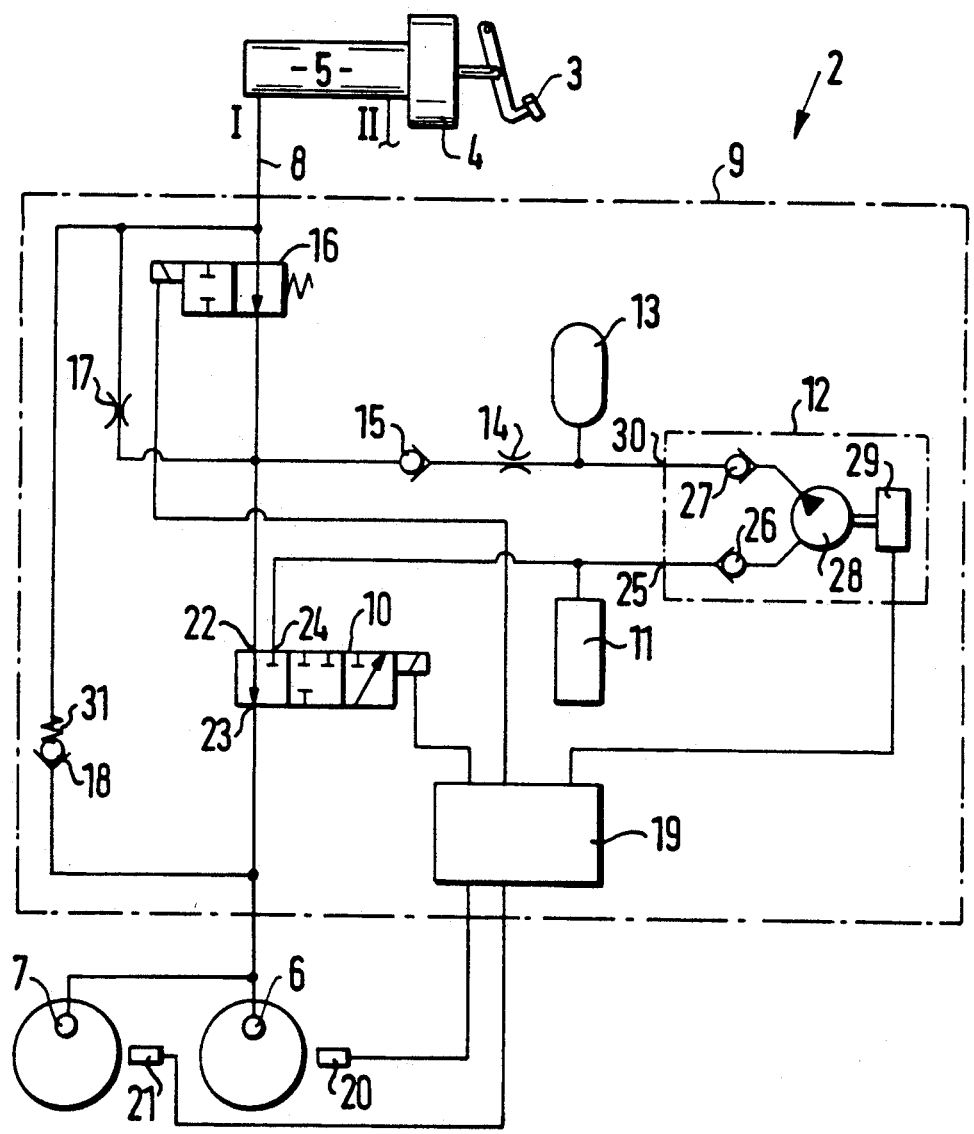
FIG. 1 shows a first exemplary embodiment of the vehicle brake system according to the invention.

The vehicle brake system 2 according to the invention, as shown in FIG. 1, has a brake pedal 3, a brake booster 4 following it, a master brake cylinder 5 mounted on the brake booster 4 and having brake circuits I and II, wheel brakes 6, 7 belonging to brake circuit I, a brake line 8 and an anti-skid apparatus 9.

An anti-skid apparatus 9 can also be associated with brake circuit II in the same manner (not shown). For the sake of simplicity, this anti-skid apparatus and the wheel brakes associated with it are not shown.

The anti-skid apparatus 9 has one anti-skid valve assembly 10 in common for both wheel brakes 6 and 7, a low-pressure reservoir 11, a return pump 12, a damper chamber 13, a damper throttle 14, a check valve 15, an electrically controllable 2/2-way valve 16, a bypass valve 17, and a wheel brake relief valve 18, embodied as a check valve, along with a control unit 19 and wheel rotation sensors 20, 21. The anti-skid valve assembly 10 is for instance embodied, as shown, as a 3/3-way magnetic valve. It has a first connection 22, which can be supplied with brake pressure from the master brake cylinder 5 via the 2/2-way valve 16 and the brake line 8; a second connection 23, which communicates with the wheel brakes 6 and 7; and a third connection 24, which communicates with both the low-pressure reservoir 11 and an inlet 25 of the return pump 12. Instead of such a 3/3-way magnetic valve, a combination of simpler valves, for instance 2/2-way magnetic valves could also be used, which is a decision within the competence of one skilled in the art. The return pump 12 has an inlet valve 26, an outlet valve 27 and between them pump elements 28, which for instance include a cylinder known per se and not shown, a piston displaceable in it, and an eccentric, which is drivable by an electric motor 29. Downstream of the outlet valve 27, the return pump 12 has an outlet 30. This outlet 30 communicates with both the damper chamber 13 and the damper throttle 14. The damper chamber 13 may, as proposed in German Offenlegungsschrift 26 43 860, be embodied as a hollow chamber inside a metal housing. However, the damper chamber 13 could also be embodied in some other arbitrary way, for instance as a piston reservoir or as a diaphragm reservoir. Viewed from the outlet 30 of the return pump 12, the check valve 15 is connected downstream of the damper throttle 14. The check valve 15 communicates with both the first connection 22 of the anti-skid valve assembly 10 and the bypass throttle 17. The bypass throttle 17, in turn, communicates continuously with the master brake cylinder via the brake line 8 of the brake circuit I. The bypass throttle 17 forms a bypass around the 2/2-way valve 16, which in the normal state makes the master brake cylinder 5 communicate with the first inlet 22 of the anti-skid valve assembly 10, but is closed in anti-skid operation.

In the basic position of the anti-skid valve assembly 10, this assembly is open between the first connection 22 and the second connection 23, so that flows of pressure fluid that are forced from the master brake cylinder 5 and/or from the return pump 12 through the damper throttle 14 can reach the wheel brakes 6 and 7. The check valve 18 is installed between the wheel brakes 6 and 7 and the master brake cylinder 5 in such a manner that it can be opened by means of a sufficient pressure drop from the wheel brakes 6 and 7 to the master brake cylinder 5. A residual pressure then remaining in the wheel brakes 6 and 7 is dependent on the force of a spring 31, which is provided to provide tight sealing with respect to pressures originating in the master brake cylinder 5.

The control unit 19 is embodied to receive wheel rotation signals from the wheel rotation sensors 20 and 21 and to output control signals whenever at least one of the wheel rotation sensors 20 or 21 furnishes signal trains leading the control unit 19 to conclude that a predetermined slip threshold has been exceeded. The control unit 19 controls the 2/2-way valve 16, the anti-skid valve assembly 10 and the electric motor 29.

Function of the Vehicle Brake System

When the brake pedal 3 is unactuated, the valves 10 and 16 are in the basic positions shown. Actuation of the brake pedal 3 has the effect, via the brake booster 4 and the master brake cylinder 5, that brake pressure reach the wheel brakes 6 and 7 through the brake line 8, the 2/2-way valve 16 and the anti-skid valve assembly 10. As long as there is adequate traction between the wheels associated with the wheel brakes 6 and 7 and a road surface located beneath the wheels, the anti-skid apparatus 9 remains inactive.

If increasingly forceful actuation of the brake pedal 3 or a lessening of traction causes the control unit 19 to ascertain a danger of wheel locking, on the basis of sensor signal trains from the wheel rotation sensors 20, 21, then the control unit directs the anti-skid valve assembly 10 into a second switching position, in which the second connection 23 communicates with the third connection 24. As a result, quantities of pressure fluid flow out of the wheel brakes 6 and 7 into the low-pressure reservoir 11, so that the brake pressures in the wheel brakes 6 and 7 drop as intended. The control unit 19 switches the electric motor 29 of the pump on, so that these quantities of pressure fluid that flow to the pump from the pressure reservoir 11 through the inlet 25 and the inlet valve 26 are pumped through the outlet valve 27 and the outlet 30 toward the damper throttle 14. Because this damper throttle 14 is known to represent a flow resistance, a pressure increase in the damper chamber 13 takes place, in the course of which at least some of the pressure fluid leaving the outlet 30 of the return pump 12 flows into the damper chamber 13. Additionally, the control unit 19 switches the 2/2-way valve 16 into its closing position. As a result, the outlet 30 of the return pump 12 now communicates with the master brake cylinder 5 solely via the bypass throttle 17. On the other hand, however, the outlet 30 communicates with the first inlet 22 of the anti-skid valve assembly. In the aforementioned second switching position of the anti-skid valve assembly 10, the communication between the first connection 22 and the second connection 23 is disrupted. As a result, quantities of pressure fluid that leave the outlet of the return pump 12 flow both into the damper chamber 13 and, throttled, into the master brake cylinder 5, so that the latter displaces the brake pedal 3 in the direction of its outset position in a damped manner. This is effected counter to the force of the driver's foot. The larger the size of the damper chamber 13, the less disturbing is the displacement of the brake pedal 3.

Once the control unit 19 has recognized that the danger of skidding has been overcome by accelerating the rotation of the wheel or wheels associated with wheel brakes 6, 7, it returns the anti-skid valve assembly 10 to its basic position, so that quantities of pressure fluid, originating predominantly from the damper chamber 13, flow into the wheel brakes 6 and 7, where they cause the brake pressure to rise again. If the contents of the damper chamber 13 should be exhausted in this process, then quantities of pressure fluid flow out of the master brake cylinder 5 through the bypass throttle 17 to the wheel brakes 6 and 7, at a slower rate. If the control unit 19 ascertains that there is a disadvantageous risk of an increase in braking slip, it can first direct the anti-skid valve assembly 10 into the first control position, in which the second connection 23 is blocked relative to the first connection 22 and the third connection 24, or into the second control position, which has already been described as the pressure-reducing control position. In the first case, a further rise in brake pressure is lessened, in order to avoid an increasing damper of wheel locking. In the second case, a nascent danger of wheel locking is fundamentally averted.

If the anti-skid valve assembly 10 should accidentally be in the first control position, with the result that the anti-skid valve assembly 10 does not allow any brake pressure to escape from the wheel brakes 6 and 7, then braking can nevertheless be terminated by releasing the brake pedal. In this case, the check valve 18 opens counter to the force of a spring 31, because of an initially adequately high pressure difference between the wheel brakes 6 and 7 and the master brake cylinder 5.

Once the control unit 19 terminates the anti-skid operation, the anti-skid valve assembly 10 and the 2/2-way valve 16 return to their basic positions shown. As a result, the system is now again ready to perform the normal braking operations as described at the beginning of this function description.

Figure 2:
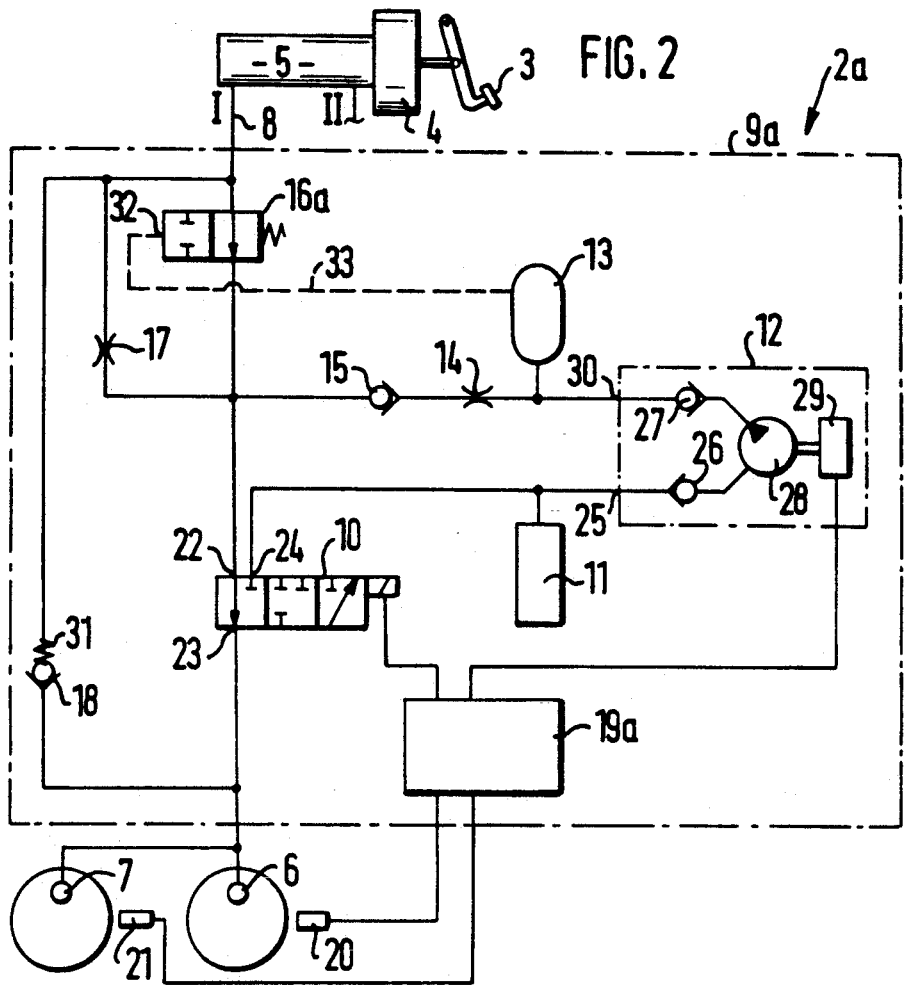
FIG. 2 shows a second exemplary embodiment of the vehicle brake system according to the invention.

The second exemplary embodiment of the vehicle brake system 2a according to the invention, as shown in FIG. 2, differs from that of FIG. 1 essentially in that a hydraulically controllable 2/2-way valve 16a is disposed between the brake line 8 and the anti-skid valve assembly 10. The hydraulically controllable 2/2-way valve 16a can be embodied in a manner known per se and can have a control inlet 32. This control inlet 32 advantageously communicates with the damper chamber 13 via a control line 33. If the damper chamber 13, as already mentioned, is embodied as a hollow chamber inside a housing block, not shown, and if the 2/2-way valve 16a is united with this housing block, then the control line 33 can for instance be embodied by any connecting bores between the 2/2-way valve 16a and the damper chamber 13. Naturally it is also possible to extend the control line 33 to some other point between the outlet valve 27 of the return pump 12 and the damper throttle 14. In all the cases described, the control pressure required for closing the 2/2-way valve 16a comes about because the return pump generates an adequate pressure increase and thus control pressure by means of the flow resistance of the damper throttle 14.

Because of the hydraulic control of the 2/2-way valve 16a into its closing position by switching on the return pump 12 and by means of pressure fluid from the low-pressure reservoir 11, which is used to build up pressure downstream of the outlet valve 27, the control unit 19a can be embodied more simply than the control unit 19 of the first exemplary embodiment. The embodiment is simpler in the sense that one cable connection can be omitted, in the event that a control signal is used for simultaneous switching on of the electric motor 29 and of the 2/2-way valve 16 of the first exemplary embodiment, by using a common output stage, although this is not shown.

For normal braking, the second exemplary embodiment functions identically to the first. In anti-skid operation the only difference is the already apparent one that the 2/2-way valve 16a, which is provided for the sake of lessening feedback on the brake pedal 3, is now hydraulically followup-controlled by the return pump 12. Once again, when the 2/2-way valve 16a is closed, the bypass throttle 17 serves to allow throttled flows of pressure fluid between the outlet 30 of the return pump 12 and the master brake cylinder 5, and/or between the master brake cylinder 5 and the anti-skid valve assembly 10.

Figure 3:
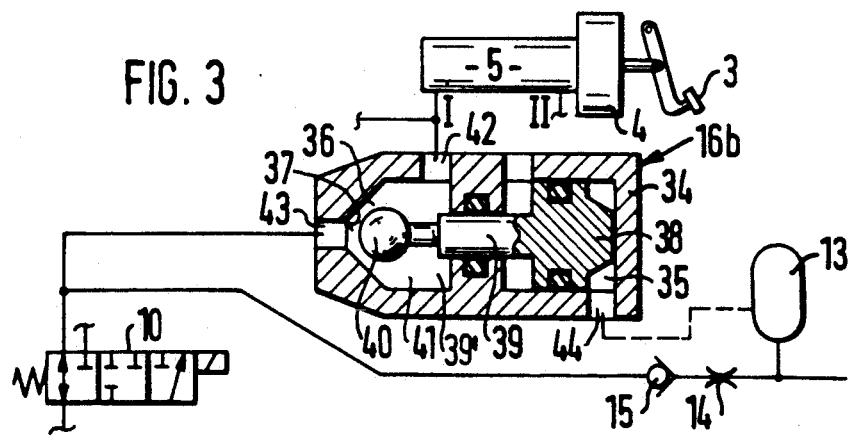
FIG. 3 shows a detail for a third exemplary embodiment, based on the vehicle brake system of FIG. 2.

A third exemplary embodiment of the invention, shown in FIG. 3, differs from the second embodiment of FIG. 2 in that a proportional valve 16b is used, instead of a valve 16a that is embodied as an on/off valve. The proportional valve has a housing 34 with a control cylinder 35 and a valve chamber 36 with a valve seat 37, as well as a control piston 38 displaceable in the control cylinder 35, an actuating rod 39 connected to the control piston 38, a closing element 40, and an opening spring 41. The closing element 40 is disposed inside the valve chamber 36 and is oriented toward the valve seat 37 and aligned with it. The control piston 38 is firmly coupled to the closing element 40 via the actuating rod 39. The opening spring 41 is built into the valve chamber 39' such that, engaging the actuating rod 39, it urges the closing element 40 away from the valve seat 37 into an open position and in so doing also determines a basic position of the control piston 38. Via a first connection 42, the valve chamber 36 communicates with the master brake cylinder 5. Via a second connection 43, which communicates with the valve seat 37, the valve 16b communicates with the anti-skid valve assembly 10 and with the check valve 15. The return pump 12 can therefore force pressure fluid to the valve seat 37 through the damper throttle 14. The control cylinder 35 also communicates with the outlet 30 of the return pump 12, via a third connection 44.

Advantageously, the diameter of the actuating rod 39 is selected to be essentially equal to the diameter of the valve seat 37 at the point at which the closing element 40 can be made to contact it. As a result, the valve 16b is substantially in pressure equilibrium with respect to the first connection 42 when it is in the closing position.

The opening spring 41 is advantageously dimensioned such that after installation in the valve chamber 36 it has an initial spring stress that cannot be overcome unless the control piston 38 is acted upon by a pressure on the order of magnitude of 30 bar. As soon as the return pump 12 is switched on, and whenever its low-pressure reservoir 11 has enough pressure fluid, the closing element 40 is moved toward the valve seat. Because in this process the opening spring 41 is further compressed in addition to being prestressed, a pressure higher than the aforementioned one is needed in the control cylinder 35 to achieve complete closure of the valve 16b. By means of a suitable selection of the stiffness of the opening spring 41, it can now be attained that for example if the pressure derived from the return pump 12 increases in the control cylinder 35 to a pressure level of substantially 60 bar, the valve 16b will close completely. It is accordingly apparent that, depending on given conditions that initiate the particular anti-skid event, when the return pressure increases a continuous progressively narrowing of a flow cross section located between the valve seat 37 and the closing element 4 takes place. It is also apparent that as a result, at lower return pressures, which are capable of exerting only slight force on the brake pedal 3, the valve 16b is practically completely open. Low return pressures are generally a consequence of low brake pressures, so that brake pedal motions are generally agreeably short. Contrarily, if higher brake pressures are produced, which can also lead to higher return pressures, then larger quantities of pressure fluid are involved. These will then flow into the master brake cylinder 5 in a more severely throttled manner, because of the resultant controlled throttling action inside the valve 16b. Accordingly, disagreeable motions of the brake pedal 3 in the direction of its outset position are avoided. However, in that case the damper chamber 13 must additionally receive those quantities of pressure fluid that are prevented from flowing into the master brake cylinder. Since this causes the pressure in the damper chamber 13 to rise again, so that a higher propellant pressure is also active in the damper throttle 14, disagreeable motion of the brake pedal 3 can be avoided accordingly by the further progressive closure of the valve 16b.

In the exemplary embodiment of FIG. 3, the bypass throttle 17 of the second exemplary embodiment of FIG. 2 can appropriately be used on a selective basis. As a result, a remaining cross section is left between the return pump 12 and the master brake cylinder 5, and this cross section can be optimized by trial and error. On the other hand, the valve seat 37 could be embodied such that the separate installation of this bypass throttle 17 becomes unnecessary.

In each case, these exemplary embodiments have been described with respect to an anti-skid valve assembly 10, and two wheel brakes 6 and 7 connected to it. Thus each of the anti-skid apparatuses 9 and 9a described makes single-channel brake pressure adjusters. One-channel brake pressure adjusters of this kind are preferably used for adjusting the pressure in the rear wheel brakes in common. Naturally it is understood that whenever brake circuit II is to have more than a single channel, two such anti-skid valve assemblies 10 can be provided; as a result, as is conventional in this art, two control or adjustment channels are available within one brake circuit. As a result, left and right front wheel brakes, for instance, can be individually supplied with suitable brake pressures. However, it is additionally possible to connect one adjusting channel to one front wheel brake for instance, and to connect the other adjusting channel to a rear wheel brake diagonally of it. All these brake circuit embodiments can be made by employing the concept of the invention, by which an economical brake system that is arranged to prevent the danger of wheel locking, is more convenient to use, and protects a driver from irritation caused by perhaps surprisingly major deflection of the brake pedal 3 can be achieved, at little effort and expense.

With increasing size of the damper chamber 13, the incorporation of the check valve 15 becomes increasingly important. This check valve in fact prevents the filling of an empty damper chamber 13 with pressure fluid from the master brake cylinder 5, in a manner known per se, when the brake pedal 3 is actuated. Otherwise, undesirably long brake pedal travel would ensue.

Figure 4:
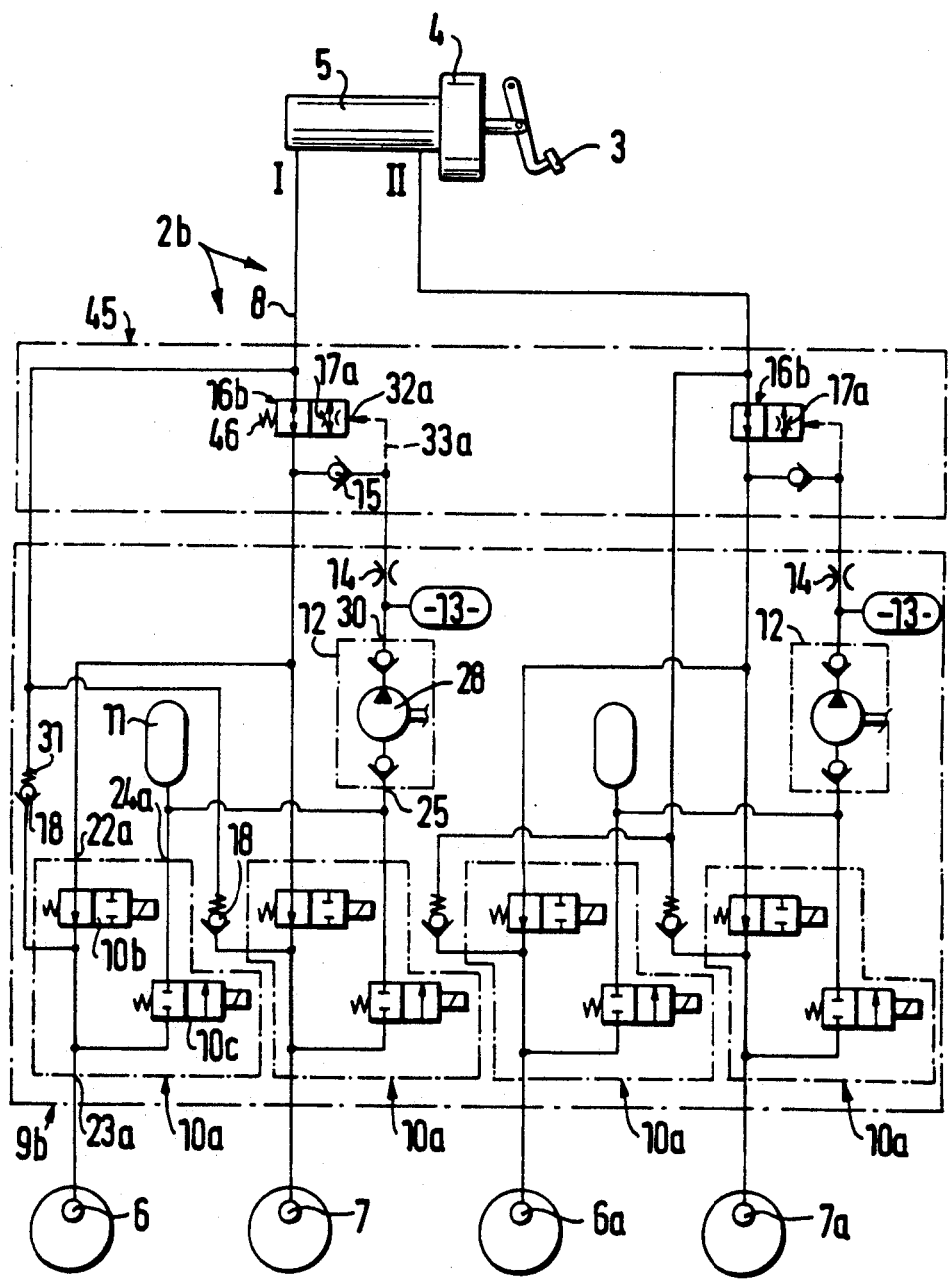
FIG. 4 shows a fourth exemplary embodiment.

The fourth exemplary embodiment of the vehicle brake system 2b shown in FIG. 4 also has a brake pedal 3, a brake booster 4, a master brake cylinder 5, at least two wheel brakes 6, 7, and a brake line 8 for the brake circuit I, as well as an anti-skid apparatus 9b.

The anti-skid apparatus 9b differs from the anti-skid apparatus 9 already described in that its anti-skid valve assembly 10a is made up as already suggested from two 2/2-way magnetic valves 10b and 10c. The 2/2-way magnetic valve 10b is normally open, and the 2/2-way magnetic valve 10c is normally closed. Analogously to the exemplary embodiment described above, the anti-skid valve assembly 10a has a first connection 22a associated with it. This connection is appropriately connected to the 2/2-way valve 16b. A second connection 23a of the magnetic valve assembly 10b is connected to one wheel brake 6 in this exemplary embodiment. A third connection 24a again communicates with a low-pressure reservoir 11 and one inlet 25 of a return pump 12. A sufficiently large damper chamber 13 is again connected to the outlet of this return pump 12. Downstream of the sufficiently large damper chamber 13 is a damper throttle 14, which is adjoined by the check valve 15 of the first exemplary embodiment, which in turn communicates with the first connection 22a of the anti-skid valve assembly 10a. This check valve 15 also communicates with the 2/2-way valve 16b, however, analogously to the exemplary embodiment described above. On the other hand though, the 2/2-way valve 16b also communicates with the master brake cylinder 5, via the brake line 8 of the brake circuit I. A wheel brake relief valve 18, having the spring 31 already described, is located between the wheel brake 6 and the master brake cylinder 5.

In this exemplary embodiment, the bypass throttle 17a is integrated with the 2/2-way valve 16a. The 2/2-way valve 16b has a control inlet 32a, which communicates with the damper throttle 14 via a control line 33a and as a result receives control pressures from the outlet 30 of the return pump 12. During anti-skid operation, the return pump 12 is switched on, so that analogously to the exemplary embodiment described above, control pressure reaches the control inlet 32a of the 2/2-way valve 16b, where it brings about a switchover from an unthrottled flow cross section to the cross section of the bypass throttle 17a. The bypass throttle 17a can for instance have a throttle bore with a diameter of 0.3 to 0.5 mm.

Depending on the individual size of the two wheel brakes 6 and 7, which are to be supplied with pressure fluid from the master brake cylinder 5 by means of the 2/2-way valve 16b, and depending on the pumping capacity selected for the return pump 12, optimization or individualized adaptation of such bypass throttles 17a can be done by easily performed experiments.

As already noted, the second wheel brake 7 is associated with the 2/2-way valve 16b. In this exemplary embodiment, the second wheel brake 7 has its own anti-skid valve assembly 10a. This wheel brake 7 accordingly is assigned its own wheel brake relief valve 18. Because it is prior art to associate valve assemblies for independent brake pressure adjustment in two wheel brakes with one brake circuit I, further description of this exemplary embodiment will be unnecessary.

Further wheel brakes 6a and 7a belong to the brake circuit II of this exemplary embodiment. Analogously, these wheel brakes 6a and 7a may optionally each have their own anti-skid valve assemblies 10a, and consequently their own return pump 12, their own damper chamber 13 and damper throttle 14, and their own 2/2-way valve 16b with an integrated bypass throttle 17a as well.

The operation of the bypass throttle 17a is equivalent to that of the bypass throttle 17 of the exemplary embodiment described above, during anti-skid operation.

The anti-skid apparatus 9b may be embodied as a basic version which is intended to be economical and therefore does not have the level of luxury achieved by the invention. The 2/2-way valves can be accommodated in a separate block 45, which can be united with the basic exemplary embodiment of the anti-skid apparatus 9a, for instance by screwing them together. The result is a modular manner of construction, which is capable of meeting various power requirements.

The fifth exemplary embodiment of the vehicle brake system, 2c of FIG. 5, again has a brake pedal 3, a master brake cylinder 5, and brake circuits I and II. As in the exemplary embodiment of FIG. 2, brake I includes two wheel brakes 6 and 7, the brake pressures of which can be varied collectively by means of an anti-skid valve assembly 10. Once again, a low-pressure reservoir 11 and a return pump 12 are connected to this anti-skid valve assembly 10. The outlet side of the return pump 12, a sufficiently large damper chamber 13, and a damper throttle are again provided. Once again, the damper throttle 14 communicates via a check valve 15 with both the anti-skid valve assembly 10 and a 2/2-way valve 16c.

Differing from the exemplary embodiment of FIG. 4, the 2/2-way valve 16c has a first control inlet 32b and a second control inlet 32c. As in the embodiment of FIG. 2, the control inlet 32b communicates with the damper chamber 13 via a control line 33. The second control inlet 32c communicates with the brake line 8 and thus with an associated portion of the master brake cylinder 5. The bypass throttle 17a is integrated, as described for the embodiment shown in FIG. 4.

An opening spring 46 associated with the 2/2-way valve 16c is dimensioned such that when the control inlet 32c has no pressure, a control pressure of 10 bar, for instance, supplied to the control inlet 32b, is sufficient for switchover of the 2/2-way valve 16c from its unthrottled normal position to the throttled position in which only the bypass throttle 17a allows pressure fluid to flow through.

The control pressure of the return pump 12 can again be supplied through the damper chamber 13 and a control line 33 to the 2/2-way valve 16c, as soon as the return pump 12 is switched on as already described of performing anti-skid operations. Through the second control inlet 32c, a pressure generated in the master brake cylinder 5 counteracts the pressure prevailing in the first control inlet 32b, so that once the pressure of the master brake cylinder 5 is high enough, the 2/2-way valve 16c can be switched back into the open basic position. This has the advantage that during the course of anti-skid operation, the driver can furnish the wheel brakes 6 and 7 with higher braking pressure arbitrarily, by increasing the pressure in the master brake cylinder 5. This may be the case for instance if the driver is driving his vehicle on a slippery surface, resulting in the onset of anti-skid operation, and then reaches a road surface with better traction, which enables substantially greater braking deceleration. As already mentioned in the introductory portion of the specification, a 2/2-way valve 16c embodied in this way also has the advantage that an increase in the pressures in the wheel brakes 6 and 7 is possible even if the opening spring 46 should fail.

Naturally the 2/2-way valve 16c along with both its control inlets 32b and 32c could be appropriately used in the other exemplary embodiments, both those described above and those to be described below.

Figure 5:
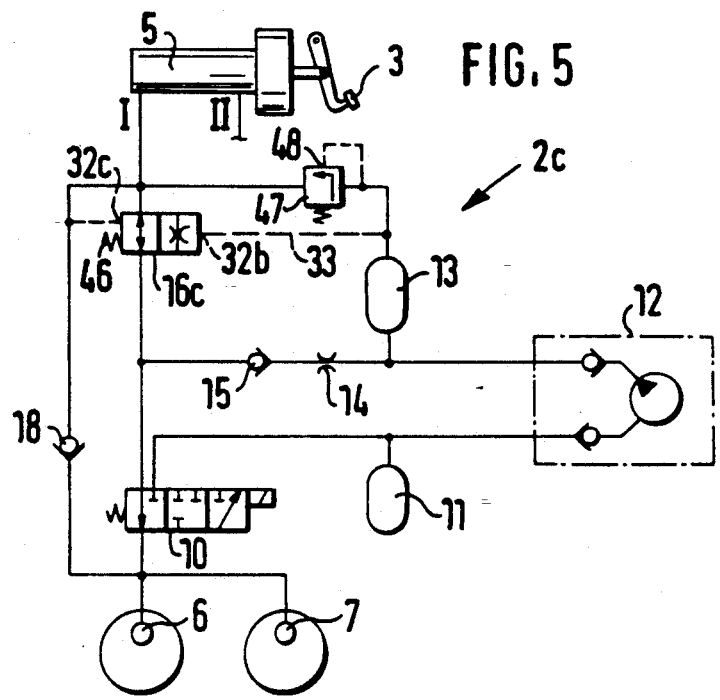
FIG. 5 shows a fifth exemplary embodiment.

As a further special feature compared with the exemplary embodiments already described, in the embodiment of FIG. 5 a pump protection valve is provided between the return pump 12 and the master brake cylinder 5. In FIG. 5, this pump protection valve is shown in the form of a pressure limiting valve 47, represented by a standard symbol. This pressure limiting valve 47 opens whenever a preselected pressure reaches its control inlet 48. The pressure of the return pump 12 serves as the control pressure. This kind of embodiment of a pump protection valve is intrinsically expensive in engineering terms, but it has the advantage that the pressure limitation takes place independently of the pressure prevailing at the moment in the master brake cylinder 5.

Figure 6:
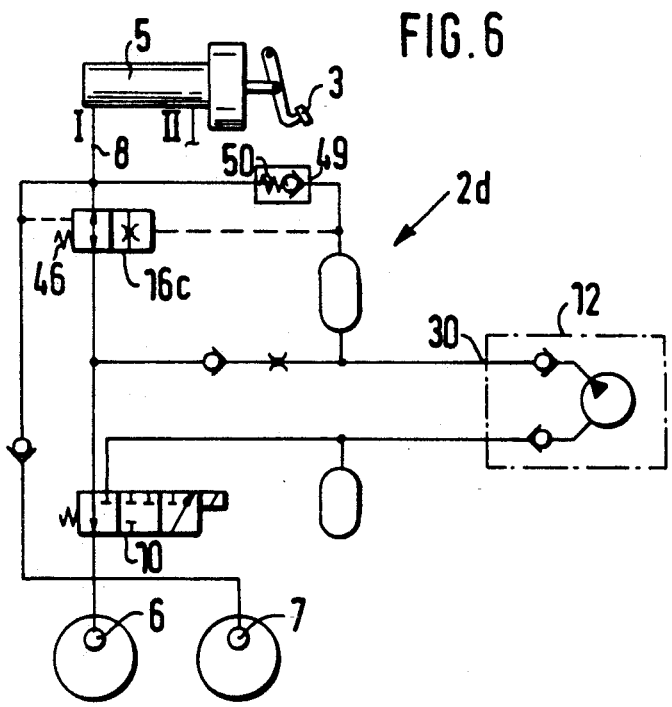
FIG. 6 shows a sixth exemplary embodiment.

In the sixth exemplary embodiment of the vehicle brake system 2d shown in FIG. 6, the pump protection valve is made in the form of a check valve 49, which may have a spring 50. Because it is embodied as a check valve 49, the pump protection valve opens when a predetermined pressure difference is reached between the outlet 30 of the return pump 12 and the master brake cylinder 5. This pressure difference can be determined by how the spring 50 is embodied. Because a check valve 49 is intrinsically very economical and reliable, the return pump 12 can be economically protected against overload.

An overload of the return pump 12 could arise if a bypass throttle, regardless of which exemplary embodiment it may be provided in, should become more or less plugged with dirt or other contamination, and accordingly, a pressure difference between the pressure prevailing in the master brake cylinder 5 and the return pressure instantaneously furnished by the return pump 12 can become correspondingly greater.

Figure 7:
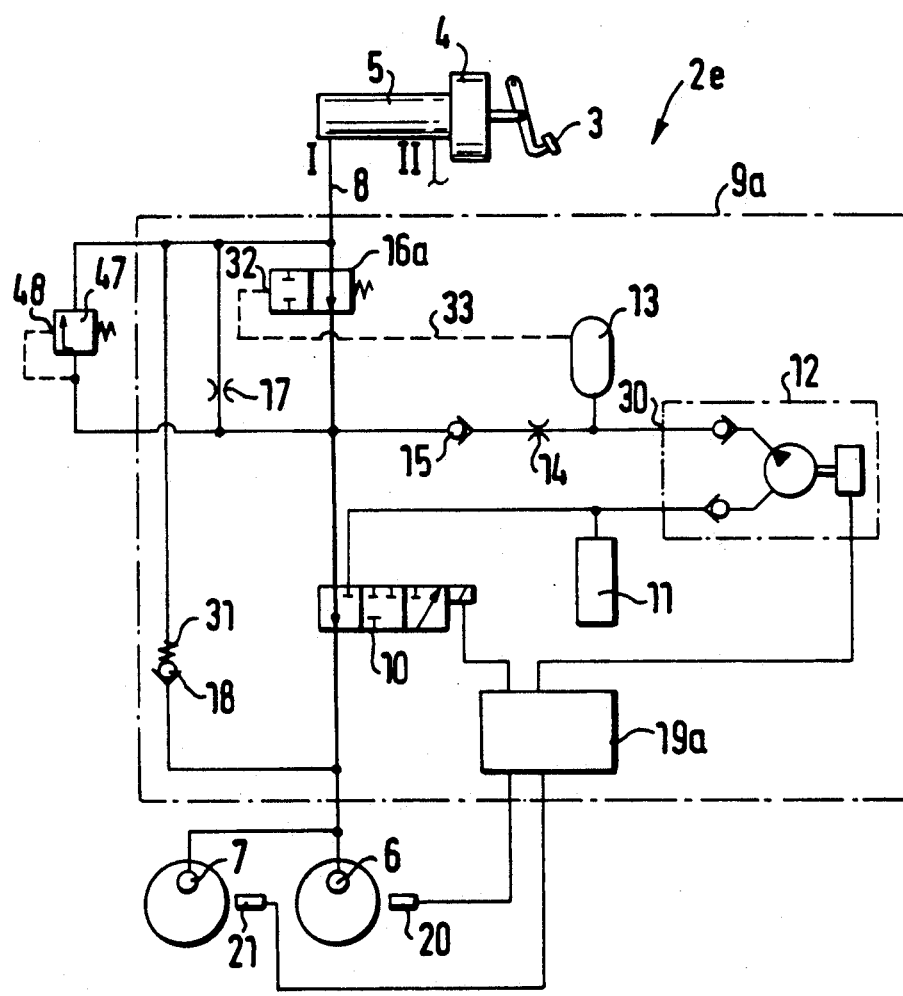
FIG. 7 shows a seventh exemplary embodiment of the vehicle brake system according to the invention.

The seventh exemplary embodiment of the vehicle brake system 2e of FIG. 7 is an improvement on the exemplary embodiment of FIG. 2, because of the disposition of the above-described pump protection valve. In the example of FIG. 7, the pump protection valve is shown and embodied as a pressure limiting valve 47. However, as is apparent from the foregoing description, a check valve 49 can selectively be incorporated, instead of this kind of pressure limiting valve 47. This averts an overload of the return pump 12, because quantities of pressure fluid can be diverted from the pump outlet 30 into the master brake cylinder 5, circumventing any of the bypass throttles described.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A vehicle brake system having a master brake cylinder, at least one wheel brake, and at least one anti-skid apparatus installed between them, further having at least one anti-skid valve assembly in a brake line between the master brake cylinder and at least one wheel brake, and connected with one inlet line of a return pump, said return pump having an outlet (30) connected with an outlet line followed downstream thereof by a damper chamber connected to said outlet line and a damper throttle in said outlet line, said outlet line with said damper throttle therein being connected with the brake line connected to the anti-skid valve assembly, a valve (16, 16a, 16b, 16c) which is at least partially closable during anti-skid operation being provided in said brake line between the master brake cylinder, the damper throttle (14) and the anti-skid valve assembly (10), and the damper chamber (13) is provided with an enlarged pressure fluid retention capacity.

2. A vehicle brake system as defined by claim 1, in which the valve (16) comprises an electrically controllable 2/2-way valve that is open when without current and said brake system includes a bypass that bypasses said valve (16) and includes a throttle (17) therein.

3. A vehicle brake system as defined by claim 1, in which the valve (16a, 16b, 16c) comprises a hydraulically closable valve that is at least partially closable hydraulically counter to the force of an opening spring (41) and has a first control inlet (32, 32a, 32b) that communicates with the outlet (30) of the return pump (12).

4. A vehicle brake system as defined by claim 3, in which the valve (16b) comprises a seat valve that is substantially pressure-equalized, and the opening spring (41) is installed with an initial pre-load thereon such that a return pressure of substantially 30 bar is necessary to overcome such prestressing force.

5. A vehicle brake system as defined by claim 4, in which a rigidity of the opening spring (41) is preselected such that a pumping pressure of the return pump (12) on the order of 60 bar effects a substantially complete closure of the valve (16b).

6. A vehicle brake system as defined by claim 3, in which a bypass throttle (17) that leaves a residual cross section open is provided in the hydraulically closable valve (16b).

7. A vehicle brake system as defined by claim 6, in which the bypass throttle (17a) has a cross section of up to substantially 0.2 mm².

8. A vehicle brake system as defined by claim 7, in which an opening spring (46) is installed in the valve with initial stress such that a return pressure of at least 10 bar is necessary in order to overcome its closing force.

9. A vehicle brake system as defined by claim 7, in which the valve (16c) has a second control inlet (32c), connected permanently to the master brake cylinder (5), and the valve (16c) is arranged such that control pressures exerted by the master brake cylinder (5) counteract the control pressures exerted by the return pump (12) furnished to the first control inlet (32b).

10. A vehicle brake system as defined by claim 6, in which an opening spring (46) is installed in the valve with initial stress such that a return pressure of at least 10 bar is necessary in order to overcome its closing force.

11. A vehicle brake system as defined by claim 10, in which the valve (16c) has a second control inlet (32c), connected permanently to the master brake cylinder (5), and the valve (16c) is arranged such that control pressures exerted by the master brake cylinder (5) counteract the control pressures exerted by the return pump (12) furnished to the first control inlet (32b).

12. A vehicle brake system as defined by claim 6, in which the valve (16c) has a second control inlet (32c), connected permanently to the master brake cylinder (5), and the valve (16c) is arranged such that control pressures exerted by the master brake cylinder (5) counteract the control pressures exerted by the return pump (12) furnished to the control inlet (32b).

13. A vehicle brake system as defined by claim 3, in which the valve (16c) has a second control inlet (32c), connected permanently to the master brake cylinder (5), and the valve (16c) is arranged such that control pressures exerted by the master brake cylinder (5) counteract the control pressures exerted by the return pump (12) furnished to the first control inlet (32b).

14. A vehicle brake system as defined by claim 1, in which a pump protection valve (15, 49) is disposed between the outlet (30) of the return pump (12) and the master brake cylinder (5).

15. A vehicle brake system as defined by claim 14, in which the pump protection valve comprises a pressure limiting valve (47).

16. A vehicle brake system as defined by claim 14, in which the pump protection valve comprises a check valve (49) which can be opened in the direction of the master brake cylinder (5) counter to the force of a spring (50).

17. A vehicle brake system as defined by claim 1, in which the at least partially closable valve (16, 16a, 16b, 16c) is accommodated in a block (45) that can be secured to the anti-skid apparatus (9, 9a).

18. A vehicle brake system as defined by claim 1, in which a check valve (15) openable by means of pressure from the return pump (12) in the direction of the anti-skid valve assembly (10) is disposed between the damper chamber (13) and a first connection (22) of the anti-skid valve assembly (10).

19. A vehicle brake system as defined by claim 1, in which a wheel brake relief valve (18), provided as a check valve openable toward the master brake cylinder (5), connects at least one wheel brake (6, 7) to the master brake cylinder (5).

* * * * *